(12) United States Patent
DeVaul

(10) Patent No.: US 9,511,844 B1
(45) Date of Patent: Dec. 6, 2016

(54) SOLAR MONTGOLFIER BALLOON WITH A FUEL CELL

(71) Applicant: X Development LLC, Mountain View, CA (US)

(72) Inventor: Richard Wayne DeVaul, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 217 days.

(21) Appl. No.: 14/010,012

(22) Filed: Aug. 26, 2013

(51) Int. Cl.
*B64B 1/62* (2006.01)
*B64B 1/44* (2006.01)

(52) U.S. Cl.
CPC .. *B64B 1/44* (2013.01); *B64B 1/62* (2013.01)

(58) Field of Classification Search
CPC ....... G02B 26/10; G02B 11/24; G01S 13/86; G01S 13/865; G01C 3/08; B64B 1/62
USPC .......................................................... 244/96
See application file for complete search history.

(56) References Cited

U.S. PATENT DOCUMENTS

| | | | |
|---|---|---|---|
| 3,029,596 A | 4/1962 | Hanold et al. | |
| 4,073,516 A | 2/1978 | Kling | |
| 4,174,082 A | 11/1979 | Eshoo | |
| 4,237,868 A | 12/1980 | Overton | |
| 4,361,297 A * | 11/1982 | Pommereau | B64B 1/58 244/126 |
| 4,391,099 A | 7/1983 | Sorensen | |
| 4,986,494 A | 1/1991 | Tockert | |
| 5,890,676 A | 4/1999 | Coleman | |
| 6,119,979 A * | 9/2000 | Lee | B64B 1/44 244/61 |
| 6,305,641 B1 | 10/2001 | Onda | |
| 6,648,272 B1 * | 11/2003 | Kothmann | 244/97 |
| 6,908,702 B2 * | 6/2005 | McElroy et al. | 244/30 |
| 7,249,733 B2 | 7/2007 | Palmer | |
| 7,261,255 B2 | 8/2007 | Li | |

(Continued)

FOREIGN PATENT DOCUMENTS

| | | |
|---|---|---|
| DE | 3844505 A1 | 5/1990 |
| FR | 2803884 A1 | 7/2001 |

(Continued)

OTHER PUBLICATIONS

Nachbar, Daniel, and John Fabel, "Next Generation Thermal Airship," AIAA 3rd Annual Aviation Technology, Integration, and Operations (ATIO) Technical Forum, 2003.

*Primary Examiner* — Tien Dinh
*Assistant Examiner* — Vicente Rodriguez
(74) *Attorney, Agent, or Firm* — McDonnell Boehnen Hulbert & Berghoff LLP

(57) ABSTRACT

Example embodiments may facilitate altitude control by a balloon in a balloon network. An example method involves: (a) operating a balloon in a first mode, wherein the balloon includes an envelope and a fuel cell, (b) while the balloon is operating in the first mode: (i) drawing ambient air from outside the envelope into the envelope through a first opening, (ii) using solar energy to heat the air in the envelope such that a buoyancy of the balloon is increased, and (iii) releasing air from inside the envelope to outside the envelope through a second opening such that the buoyancy of the balloon is decreased; (c) transitioning to operating the balloon in a second mode; and while operating the balloon in the second mode, using a portion of power generated by the fuel cell to heat the air in the envelope such that the buoyancy of the balloon is increased.

31 Claims, 6 Drawing Sheets

(56) References Cited

U.S. PATENT DOCUMENTS

| | | |
|---|---|---|
| 7,573,147 B2 | 8/2009 | Karim |
| 7,887,007 B2 | 2/2011 | Mitchell |
| 7,913,948 B2 | 3/2011 | Porter |
| 8,033,497 B2* | 10/2011 | Kwok et al. .................. 244/5 |
| 8,061,651 B2 | 11/2011 | Sinsabaugh |
| 8,074,638 B2 | 12/2011 | Cummings |
| 8,256,705 B2 | 9/2012 | Smith |
| 8,342,442 B1 | 1/2013 | Dancila |
| 8,387,914 B2 | 3/2013 | Smith |
| 2002/0134884 A1* | 9/2002 | Perry .................. B64B 1/06 244/24 |
| 2006/0000945 A1 | 1/2006 | Voss |
| 2008/0196410 A1 | 8/2008 | Primlani |
| 2009/0294576 A1 | 12/2009 | LaForge |
| 2011/0101692 A1 | 5/2011 | Bilaniuk |
| 2012/0235410 A1 | 9/2012 | Serrano |
| 2013/0037650 A1 | 2/2013 | Heppe |
| 2013/0160451 A1 | 6/2013 | Seifert |
| 2014/0048646 A1 | 2/2014 | DeVaul et al. |

FOREIGN PATENT DOCUMENTS

| | | |
|---|---|---|
| GB | 2261705 | 5/1993 |
| JP | 2007205341 A | 8/2007 |
| WO | 9612642 | 5/1996 |
| WO | WO2014028201 | 2/2014 |

* cited by examiner

SOLAR MONTGOLFIER BALLOON WITH A FUEL CELL

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

SUMMARY

In one aspect, a computer-implemented method involves: operating a balloon in a first mode, wherein the balloon comprises an envelope with a first opening and a second opening, and a fuel cell; while operating the balloon in the first mode: drawing ambient air from outside the envelope to inside the envelope through the first opening; using solar energy to heat the air in the envelope such that a buoyancy of the balloon is increased; and releasing air from inside the envelope to outside the envelope through the second opening such that the buoyancy of the balloon is decreased; transitioning to operating the balloon in a second mode; and while operating the balloon in the second mode: using a portion of power generated by the fuel cell to heat the air in the envelope such that the buoyancy of the balloon is increased.

In another aspect, non-transitory computer readable medium may have stored therein instructions that, upon execution by one or more processors of a system, cause the system to carry out functions including: operating a balloon in a first mode, wherein the balloon comprises an envelope with a first opening and a second opening, and a fuel cell; while operating the balloon in the first mode: drawing ambient air from outside the envelope to inside the envelope through the first opening; using solar energy to heat the air in the envelope such that a buoyancy of the balloon is increased; and releasing air from inside the envelope to outside the envelope through the second opening such that the buoyancy of the balloon is decreased; transitioning to operating the balloon in a second mode; and while operating the balloon in the second mode: using a portion of power generated by the fuel cell to heat the air in the envelope such that the buoyancy of the balloon is increased.

In a further aspect, a balloon system includes: a balloon having an envelope with a first opening and a second opening, the first opening being configured to draw ambient air from outside the envelope to inside the envelope, and the second opening being configured to release air from inside the envelope to outside the envelope, wherein the envelope is configured to use solar energy to heat the air in the envelope such that a buoyancy of the balloon is increased, and wherein the envelope is further configured to release air from inside the envelope to outside the envelope through the second opening envelope such that the buoyancy of the balloon is decreased; and a fuel cell configured to heat the air in the envelope such that the buoyancy of the balloon is increased when solar energy is not available in sufficient quantity to heat the air in the envelope.

These as well as other aspects, advantages, and alternatives, will become apparent to those of ordinary skill in the art by reading the following detailed description, with reference where appropriate to the accompanying drawings.

DETAILED DESCRIPTION

Figure 1:
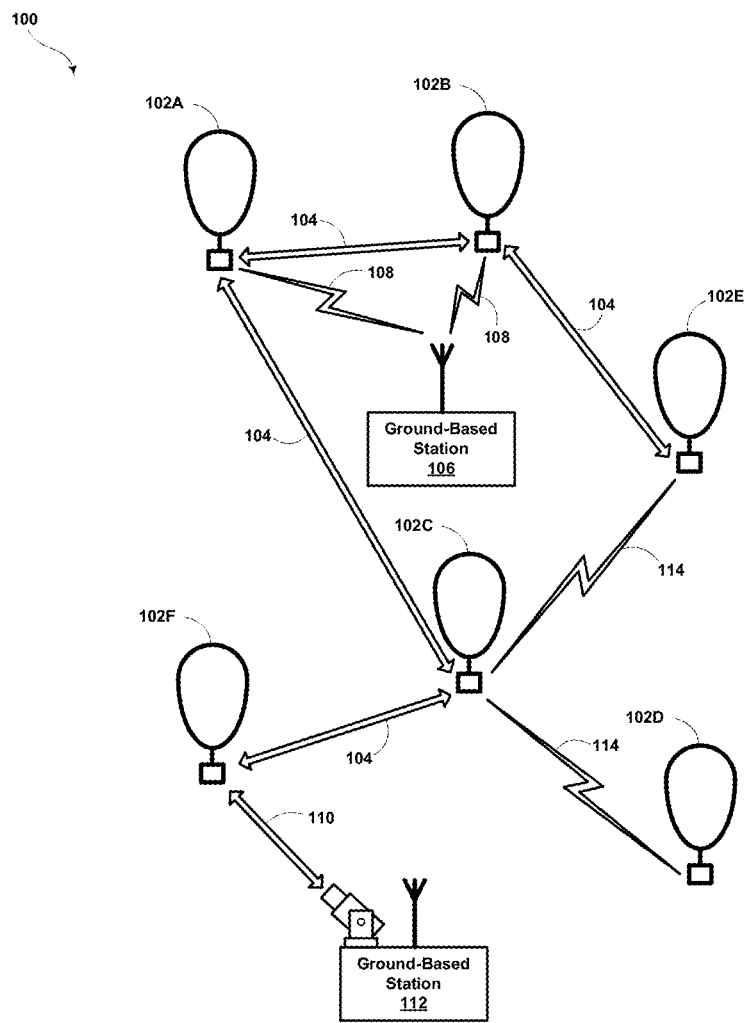
FIG. 1 is a simplified block diagram illustrating a balloon network, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

1. Overview

Example embodiments may be implemented in the context of a data network that includes a plurality of balloons; for example, a mesh network formed by high-altitude balloons deployed in the stratosphere. Since winds in the stratosphere may affect the locations of the balloons in a differential manner, each balloon in an example network may be configured to change its horizontal position by adjusting its vertical position (i.e., altitude). For instance, by adjusting its altitude, a balloon may be able find winds that will carry it horizontally (e.g., latitudinally and/or longitudinally) to a desired horizontal location.

To function as a node in a balloon network, a balloon may consume a significant amount of power. However, increasing the amount of power supplied by a battery (e.g., a Lithium-ion battery) and/or the increasing the number of batteries on a balloon will typically increase the size and weight of the battery or batteries, which may be undesirable for various reasons. Accordingly, an example embodiment may include one or more altitude control mechanisms that also function as supplemental power systems, and generate power as part of the processes to increase or decrease the altitude of the balloon.

Example embodiments may include a solar Montgolfier balloon having a renewable heat source for long duration, high altitude flight. A Montgolfier balloon is one that achieves buoyancy by means of heating the air within the balloon, the heated air thereby being (at least a portion of) the balloon's lifting gas. In a solar Montgolfier balloon, heating the air within the balloon is achieved using solar energy. At high altitudes, where sunlight can be largely unattenuated during a majority of daytime hours, solar energy may be absorbed in the daytime by a dark envelope around or forming the outside of the balloon. By including a fuel cell (or other renewable energy source) in (or as part of) the balloon, the air in the balloon may be heated during times when solar heating is absent or insufficient for heating (e.g., at night-time), and temperatures drop significantly. Long-duration flight may thus be achieved using solar energy during the daytime and a renewable energy source during the night-time.

In an example embodiment, a balloon may have an outer envelope that is open to atmospheric air, allowing it to draw cooler (ambient) air in through the bottom of the balloon, and to release (vent) hot air through the top of the balloon. This circulation of air in through the bottom and out through the top can be used to regulate the buoyancy of the balloon by regulating the temperature of the air within the envelope. Circulation-based regulation may be employed primarily (though not necessarily exclusively) during the daytime, when solar energy may tend to result in excessively hot, and therefore excessively buoyant, air in the balloon.

In accordance with example embodiments, the balloon may also include a fuel cell system used for generating heat and/or power for heating the air within the balloon during times when solar energy is not available and/or natural cooling of the air within the balloon would otherwise result in greater than a desired and/or specified loss of buoyancy through cooling. As an example, a hydrogen fuel cell could be used. The hydrogen fuel cell could be contained in an inner envelope or bladder of the balloon. The inner envelope or bladder may also contain hydrogen gas to fuel the fuel cell, as well as an oxygen source. It may also include a reservoir for water that is produced in the process of electricity generation by the fuel cell.

In addition to using solar energy to heat the air within the envelope, a portion of solar energy may be captured and used as a power source to charge or recharge one or more batteries carried by the balloon (e.g., as part of a balloon payload), and/or to recharge the fuel cell by running it in reverse. More particularly, a portion of solar energy captured may be used to covert water into hydrogen and oxygen, both of which may then be collected and stored to run the fuel cell to generate electricity at a later time. Other types of fuel cells (beside hydrogen fuel cells) may also be recharged by using solar energy to run them in reverse.

Also in accordance with example embodiments, some of the power generated by the fuel cell, possibly as well as some of the power supplied by one or more batteries may also be used to run one or more electrical devices of the balloon. Such devices could, for example, be part of a balloon payload and serve as components and/or elements of a balloon-based data network.

2. Example Balloon Networks

In an example balloon network, the balloons may communicate with one another using free-space optical communications. For instance, the balloons may be configured for optical communications using ultra-bright LEDs (which are also referred to as "high-power" or "high-output" LEDs). In some instances, lasers could be used instead of or in addition to LEDs, although regulations for laser communications may restrict laser usage. In addition, the balloons may communicate with ground-based station(s) using radio-frequency (RF) communications.

In some embodiments, a high-altitude-balloon network may be homogenous. That is, the balloons in a high-altitude-balloon network could be substantially similar to each other in one or more ways. More specifically, in a homogenous high-altitude-balloon network, each balloon is configured to communicate with nearby balloons via free-space optical links. Further, some or all of the balloons in such a network, may also be configured communicate with ground-based station(s) using RF communications. (Note that in some embodiments, the balloons may be homogenous in so far as each balloon is configured for free-space optical communication with other balloons, but heterogeneous with regard to RF communications with ground-based stations.)

In other embodiments, a high-altitude-balloon network may be heterogeneous, and thus may include two or more different types of balloons. For example, some balloons may be configured as super-nodes, while other balloons may be configured as sub-nodes. Some balloons may be configured to function as both a super-node and a sub-node. Such balloons may function as either a super-node or a sub-node at a particular time, or, alternatively, act as both simultaneously depending on the context. For instance, an example balloon could aggregate search requests of a first type to transmit to a ground-based station. The example balloon could also send search requests of a second type to another balloon, which could act as a super-node in that context.

In such a configuration, the super-node balloons may be configured to communicate with nearby super-node balloons via free-space optical links However, the sub-node balloons may not be configured for free-space optical communication, and may instead be configured for some other type of communication, such as RF communications. In that case, a super-node may be further configured to communicate with sub-nodes using RF communications. Thus, the sub-nodes may relay communications between the super-nodes and one or more ground-based stations using RF communications. In this way, the super-nodes may collectively function as backhaul for the balloon network, while the sub-nodes function to relay communications from the super-nodes to ground-based stations. Other differences could be present between balloons in a heterogeneous balloon network.

FIG. 1 is a simplified block diagram illustrating a balloon network 100, according to an example embodiment. As shown, balloon network 100 includes balloons 102A to 102F, which are configured to communicate with one another via free-space optical links 104. Balloons 102A to 102F could additionally or alternatively be configured to communicate with one another via RF links 114. Balloons 102A to 102F may collectively function as a mesh network for packet-data communications. Further, balloons 102A to 102F may be configured for RF communications with ground-based stations 106 and 112 via RF links 108. In another example embodiment, balloons 102A to 102F could be configured to communicate via optical link 110 with ground-based station 112.

In an example embodiment, balloons 102A to 102F are high-altitude balloons, which are deployed in the stratosphere. At moderate latitudes, the stratosphere includes altitudes between approximately 10 kilometers (km) and 50 km altitude above the surface. At the poles, the stratosphere starts at an altitude of approximately 8 km. In an example embodiment, high-altitude balloons may be generally configured to operate in an altitude range within the stratosphere that has lower winds (e.g., between 5 and 20 miles per hour (mph)).

More specifically, in a high-altitude-balloon network, balloons 102A to 102F may generally be configured to operate at altitudes between 17 km and 25 km (although other altitudes are possible). This altitude range may be advantageous for several reasons. In particular, this layer of the stratosphere generally has mild wind and turbulence (e.g., winds between 5 and 20 miles per hour (mph)). Further, while the winds between 17 km and 25 km may vary with latitude and by season, the variations can be modelled in a reasonably accurate manner. Additionally, altitudes above 17 km are typically above the maximum flight level designated for commercial air traffic. Therefore, interference with commercial flights is not a concern when balloons are deployed between 17 km and 25 km.

To transmit data to another balloon, a given balloon 102A to 102F may be configured to transmit an optical signal via an optical link 104. In an example embodiment, a given balloon 102A to 102F may use one or more high-power light-emitting diodes (LEDs) to transmit an optical signal. Alternatively, some or all of balloons 102A to 102F may include laser systems for free-space optical communications over optical links 104. Other types of free-space optical communication are possible. Further, in order to receive an optical signal from another balloon via an optical link 104, a given balloon 102A to 102F may include one or more optical receivers. Additional details of example balloons are discussed in greater detail below, with reference to FIG. 3.

In a further aspect, balloons 102A to 102F may utilize one or more of various different RF air-interface protocols for communication ground-based stations 106 and 112 via RF links 108. For instance, some or all of balloons 102A to 102F may be configured to communicate with ground-based stations 106 and 112 using protocols described in IEEE 802.11 (including any of the IEEE 802.11 revisions), various cellular protocols such as GSM, CDMA, UMTS, EV-DO, WiMAX, and/or LTE, and/or one or more propriety protocols developed for balloon-to-ground RF communication, among other possibilities.

In a further aspect, there may scenarios where RF links 108 do not provide a desired link capacity for balloon-to-ground communications. For instance, increased capacity may be desirable to provide backhaul links from a ground-based gateway, and in other scenarios as well. Accordingly, an example network may also include downlink balloons, which could provide a high-capacity air-ground link.

For example, in balloon network 100, balloon 102F could be configured as a downlink balloon. Like other balloons in an example network, a downlink balloon 102F may be operable for optical communication with other balloons via optical links 104. However, downlink balloon 102F may also be configured for free-space optical communication with a ground-based station 112 via an optical link 110. Optical link 110 may therefore serve as a high-capacity link (as compared to an RF link 108) between the balloon network 100 and a ground-based station 112.

Note that in some implementations, a downlink balloon 102F may additionally be operable for RF communication with ground-based stations 106. In other cases, a downlink balloon 102F may only use an optical link for balloon-to-ground communications. Further, while the arrangement shown in FIG. 1 includes just one downlink balloon 102F, an example balloon network can also include multiple downlink balloons. On the other hand, a balloon network can also be implemented without any downlink balloons.

In other implementations, a downlink balloon may be equipped with a specialized, high-bandwidth RF communication system for balloon-to-ground communications, instead of, or in addition to, a free-space optical communication system. The high-bandwidth RF communication system may take the form of an ultra-wideband system, which provides an RF link with substantially the same capacity as the optical links 104. Other forms are also possible.

Balloons could be configured to establish a communication link with space-based satellites in addition to, or as an alternative to, a ground-based communication link.

Ground-based stations, such as ground-based stations 106 and/or 112, may take various forms. Generally, a ground-based station may include components such as transceivers, transmitters, and/or receivers for communication via RF links and/or optical links with a balloon network. Further, a ground-based station may use various air-interface protocols in order communicate with a balloon 102A to 102F over an RF link 108. As such, ground-based stations 106 and 112 may be configured as an access point with which various devices can connect to balloon network 100. Ground-based stations 106 and 112 may have other configurations and/or serve other purposes without departing from the scope of the invention.

Further, some ground-based stations, such as ground-based stations 106 and 112, may be configured as gateways between balloon network 100 and one or more other networks. Such ground-based stations 106 and 112 may thus serve as an interface between the balloon network and the Internet, a cellular service provider's network, and/or other types of networks. Variations on this configuration and other configurations of ground-based stations 106 and 112 are also possible.

2a) Mesh Network Functionality

As noted, balloons 102A to 102F may collectively function as a mesh network. More specifically, since balloons 102A to 102F may communicate with one another using free-space optical links, the balloons may collectively function as a free-space optical mesh network.

In a mesh-network configuration, each balloon 102A to 102F may function as a node of the mesh network, which is operable to receive data directed to it and to route data to other balloons. As such, data may be routed from a source balloon to a destination balloon by determining an appropriate sequence of optical links between the source balloon and the destination balloon. These optical links may be collectively referred to as a "lightpath" for the connection between the source and destination balloons. Further, each of the optical links may be referred to as a "hop" on the lightpath.

To operate as a mesh network, balloons 102A to 102F may employ various routing techniques and self-healing algorithms. In some embodiments, a balloon network 100 may employ adaptive or dynamic routing, where a lightpath between a source and destination balloon is determined and set-up when the connection is needed, and released at a later time. Further, when adaptive routing is used, the lightpath may be determined dynamically depending upon the current state, past state, and/or predicted state of the balloon network.

In addition, the network topology may change as the balloons 102A to 102F move relative to one another and/or relative to the ground. Accordingly, an example balloon network 100 may apply a mesh protocol to update the state of the network as the topology of the network changes. For example, to address the mobility of the balloons 102A to 102F, balloon network 100 may employ and/or adapt various techniques that are employed in mobile ad hoc networks (MANETs). Other examples are possible as well.

In some implementations, a balloon network 100 may be configured as a transparent mesh network. More specifically, in a transparent balloon network, the balloons may include components for physical switching that is entirely optical, without any electrical involved in physical routing of optical signals. Thus, in a transparent configuration with optical switching, signals travel through a multi-hop lightpath that is entirely optical.

In other implementations, the balloon network 100 may implement a free-space optical mesh network that is opaque. In an opaque configuration, some or all balloons 102A to 102F may implement optical-electrical-optical (OEO) switching. For example, some or all balloons may include optical cross-connects (OXCs) for OEO conversion of optical signals. Other opaque configurations are also possible. Additionally, network configurations are possible that include routing paths with both transparent and opaque sections.

In a further aspect, balloons in an example balloon network 100 may implement wavelength division multiplexing (WDM), which may help to increase link capacity. When WDM is implemented with transparent switching, physical lightpaths through the balloon network may be subject to the "wavelength continuity constraint." More specifically, because the switching in a transparent network is entirely optical, it may be necessary to assign the same wavelength for all optical links on a given lightpath.

An opaque configuration, on the other hand, may avoid the wavelength continuity constraint. In particular, balloons in an opaque balloon network may include the OEO switching systems operable for wavelength conversion. As a result, balloons can convert the wavelength of an optical signal at each hop along a lightpath. Alternatively, optical wavelength conversion could take place at only selected hops along the lightpath.

Further, various routing algorithms may be employed in an opaque configuration. For example, to determine a primary lightpath and/or one or more diverse backup lightpaths for a given connection, example balloons may apply or consider shortest-path routing techniques such as Dijkstra's algorithm and k-shortest path, and/or edge and node-diverse or disjoint routing such as Suurballe's algorithm, among others. Additionally or alternatively, techniques for maintaining a particular Quality of Service (QoS) may be employed when determining a lightpath. Other techniques are also possible.

2b) Station-Keeping Functionality

In an example embodiment, a balloon network 100 may implement station-keeping functions to help provide a desired network topology. For example, station-keeping may involve each balloon 102A to 102F maintaining and/or moving into a certain position relative to one or more other balloons in the network (and possibly in a certain position relative to the ground). As part of this process, each balloon 102A to 102F may implement station-keeping functions to determine its desired positioning within the desired topology, and if necessary, to determine how to move to the desired position.

The desired topology may vary depending upon the particular implementation. In some cases, balloons may implement station-keeping to provide a substantially uniform topology. In such cases, a given balloon 102A to 102F may implement station-keeping functions to position itself at substantially the same distance (or within a certain range of distances) from adjacent balloons in the balloon network 100.

In other cases, a balloon network 100 may have a non-uniform topology. For instance, example embodiments may involve topologies where balloons area distributed more or less densely in certain areas, for various reasons. As an example, to help meet the higher bandwidth demands that are typical in urban areas, balloons may be clustered more densely over urban areas. For similar reasons, the distribution of balloons may be denser over land than over large bodies of water. Many other examples of non-uniform topologies are possible.

In a further aspect, the topology of an example balloon network may be adaptable. In particular, station-keeping functionality of example balloons may allow the balloons to adjust their respective positioning in accordance with a change in the desired topology of the network. For example, one or more balloons could move to new positions to increase or decrease the density of balloons in a given area. Other examples are possible.

In some embodiments, a balloon network 100 may employ an energy function to determine if and/or how balloons should move to provide a desired topology. In particular, the state of a given balloon and the states of some or all nearby balloons may be input to an energy function. The energy function may apply the current states of the given balloon and the nearby balloons to a desired network state (e.g., a state corresponding to the desired topology). A vector indicating a desired movement of the given balloon may then be determined by determining the gradient of the energy function. The given balloon may then determine appropriate actions to take in order to effectuate the desired movement. For example, a balloon may determine an altitude adjustment or adjustments such that winds will move the balloon in the desired manner.

2c) Control of Balloons in a Balloon Network

Figure 2:
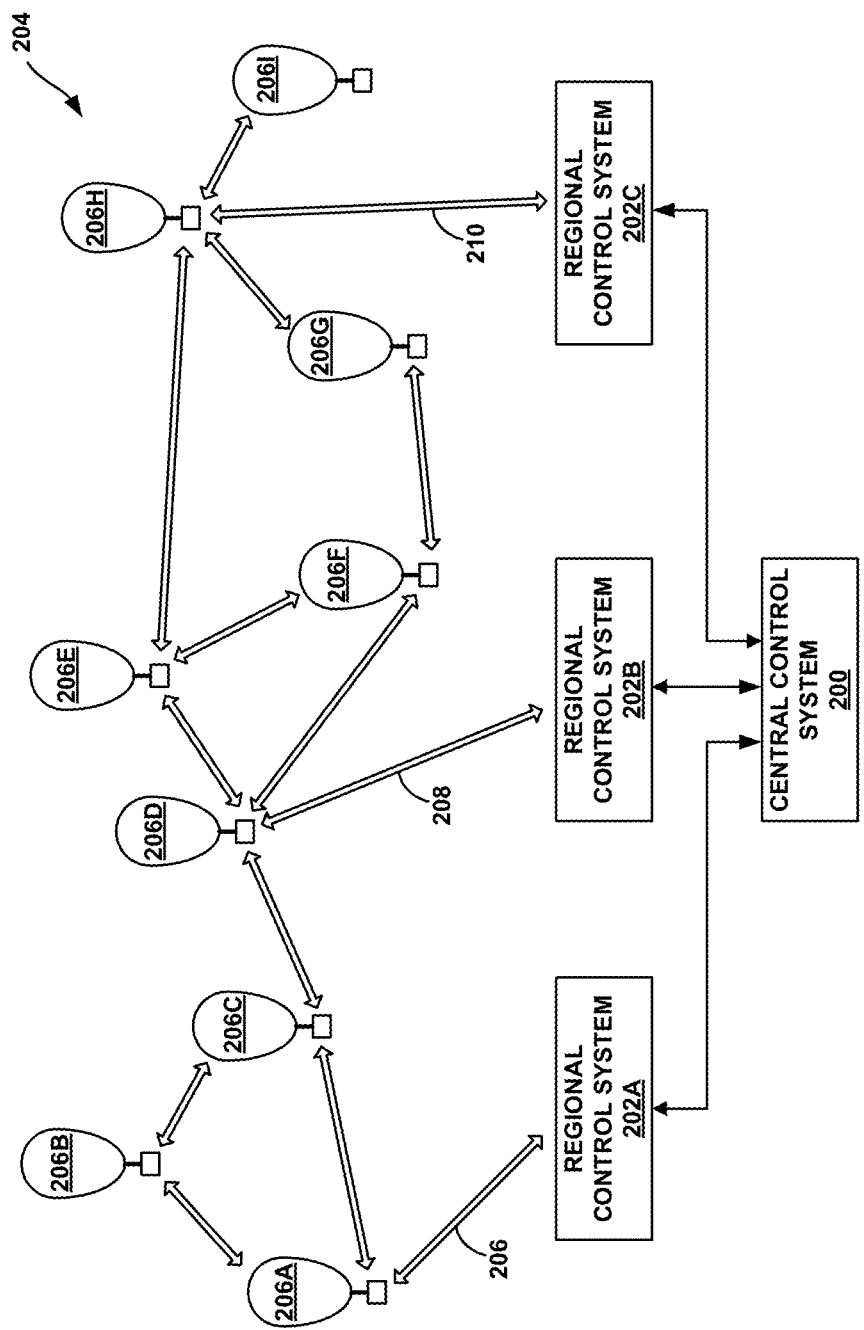
FIG. 2 is a block diagram illustrating a balloon-network control system, according to an example embodiment.

In some embodiments, mesh networking and/or station-keeping functions may be centralized. For example, FIG. 2 is a block diagram illustrating a balloon-network control system, according to an example embodiment. In particular, FIG. 2 shows a distributed control system, which includes a central control system 200 and a number of regional control-systems 202A to 202B. Such a control system may be configured to coordinate certain functionality for balloon network 204, and as such, may be configured to control and/or coordinate certain functions for balloons 206A to 206I.

In the illustrated embodiment, central control system 200 may be configured to communicate with balloons 206A to 206I via number of regional control systems 202A to 202C. These regional control systems 202A to 202C may be configured to receive communications and/or aggregate data from balloons in the respective geographic areas that they cover, and to relay the communications and/or data to central control system 200. Further, regional control systems 202A to 202C may be configured to route communications from central control system 200 to the balloons in their respective geographic areas. For instance, as shown in FIG. 2, regional control system 202A may relay communications and/or data between balloons 206A to 206C and central control system 200, regional control system 202B may relay communications and/or data between balloons 206D to 206F and central control system 200, and regional control system 202C may relay communications and/or data between balloons 206G to 206I and central control system 200.

In order to facilitate communications between the central control system 200 and balloons 206A to 206I, certain balloons may be configured as downlink balloons, which are operable to communicate with regional control systems 202A to 202C. Accordingly, each regional control system 202A to 202C may be configured to communicate with the downlink balloon or balloons in the respective geographic area it covers. For example, in the illustrated embodiment, balloons 206A, 206F, and 206I are configured as downlink balloons. As such, regional control systems 202A to 202C may respectively communicate with balloons 206A, 206F, and 206I via optical links 206, 208, and 210, respectively.

In the illustrated configuration, where only some of balloons 206A to 206I are configured as downlink balloons, the balloons 206A, 206F, and 206I that are configured as downlink balloons may function to relay communications from central control system 200 to other balloons in the balloon network, such as balloons 206B to 206E, 206G, and 206H. However, it should be understood that it in some implementations, it is possible that all balloons may function as downlink balloons. Further, while FIG. 2 shows multiple balloons configured as downlink balloons, it is also possible for a balloon network to include only one downlink balloon.

Note that a regional control system 202A to 202C may in fact just be particular type of ground-based station that is configured to communicate with downlink balloons (e.g. the ground-based station 112 of FIG. 1). Thus, while not shown in FIG. 2, a control system may be implemented in conjunction with other types of ground-based stations (e.g., access points, gateways, etc.).

In a centralized control arrangement, such as that shown in FIG. 2, the central control system 200 (and possibly regional control systems 202A to 202C as well) may coordinate certain mesh-networking functions for balloon network 204. For example, balloons 206A to 206I may send the central control system 200 certain state information, which the central control system 200 may utilize to determine the state of balloon network 204. The state information from a given balloon may include location data, optical-link information (e.g., the identity of other balloons with which the balloon has established an optical link, the bandwidth of the link, wavelength usage and/or availability on a link, etc.), wind data collected by the balloon, and/or other types of information. Accordingly, the central control system 200 may aggregate state information from some or all the balloons 206A to 206I in order to determine an overall state of the network.

The overall state of the network may then be used to coordinate and/or facilitate certain mesh-networking functions such as determining lightpaths for connections. For example, the central control system 200 may determine a current topology based on the aggregate state information from some or all the balloons 206A to 206I. The topology may provide a picture of the current optical links that are available in balloon network and/or the wavelength availability on the links. This topology may then be sent to some or all of the balloons so that a routing technique may be employed to select appropriate lightpaths (and possibly backup lightpaths) for communications through the balloon network 204.

In a further aspect, the central control system 200 (and possibly regional control systems 202A to 202C as well) may also coordinate certain station-keeping functions for balloon network 204. For example, the central control system 200 may input state information that is received from balloons 206A to 206I to an energy function, which may effectively compare the current topology of the network to a desired topology, and provide a vector indicating a direction of movement (if any) for each balloon, such that the balloons can move towards the desired topology. Further, the central control system 200 may use altitudinal wind data to determine respective altitude adjustments that may be initiated to achieve the movement towards the desired topology. The central control system 200 may provide and/or support other station-keeping functions as well.

FIG. 2 shows a distributed arrangement that provides centralized control, with regional control systems 202A to 202C coordinating communications between a central control system 200 and a balloon network 204. Such an arrangement may be useful to provide centralized control for a balloon network that covers a large geographic area. In some embodiments, a distributed arrangement may even support a global balloon network that provides coverage everywhere on earth. A distributed-control arrangement may be useful in other scenarios as well.

Further, it should be understood that other control-system arrangements are possible. For instance, some implementations may involve a centralized control system with additional layers (e.g., sub-region systems within the regional control systems, and so on). Alternatively, control functions may be provided by a single, centralized, control system, which communicates directly with one or more downlink balloons.

In some embodiments, control and coordination of a balloon network may be shared between a ground-based control system and a balloon network to varying degrees, depending upon the implementation. In fact, in some embodiments, there may be no ground-based control systems. In such an embodiment, all network control and coordination functions may be implemented by the balloon network itself. For example, certain balloons may be configured to provide the same or similar functions as central control system 200 and/or regional control systems 202A to 202C. Other examples are also possible.

Furthermore, control and/or coordination of a balloon network may be de-centralized. For example, each balloon may relay state information to, and receive state information from, some or all nearby balloons. Further, each balloon may relay state information that it receives from a nearby balloon to some or all nearby balloons. When all balloons do so, each balloon may be able to individually determine the state of the network. Alternatively, certain balloons may be designated to aggregate state information for a given portion of the network. These balloons may then coordinate with one another to determine the overall state of the network.

Further, in some aspects, control of a balloon network may be partially or entirely localized, such that it is not dependent on the overall state of the network. For example, individual balloons may implement station-keeping functions that only consider nearby balloons. In particular, each balloon may implement an energy function that takes into account its own state and the states of nearby balloons. The energy function may be used to maintain and/or move to a desired position with respect to the nearby balloons, without necessarily considering the desired topology of the network as a whole. However, when each balloon implements such an energy function for station-keeping, the balloon network as a whole may maintain and/or move towards the desired topology.

As an example, each balloon A may receive distance information $d_1$ to $d_k$ with respect to each of its k closest neighbors. Each balloon A may treat the distance to each of the k balloons as a virtual spring with vector representing a force direction from the first nearest neighbor balloon i toward balloon A and with force magnitude proportional to $d_i$. The balloon A may sum each of the k vectors and the summed vector is the vector of desired movement for balloon A. Balloon A may attempt to achieve the desired movement by controlling its altitude.

Alternatively, this process could assign the force magnitude of each of these virtual forces equal to $d_i \times d_f$, wherein $d_f$ is proportional to the distance to the second nearest neighbor balloon, for instance.

In another embodiment, a similar process could be carried out for each of the k balloons and each balloon could transmit its planned movement vector to its local neighbors. Further rounds of refinement to each balloon's planned movement vector can be made based on the corresponding planned movement vectors of its neighbors. It will be evident to those skilled in the art that other algorithms could be implemented in a balloon network in an effort to maintain a set of balloon spacings and/or a specific network capacity level over a given geographic location.

2d) Example Balloon Configuration

Figure 3:
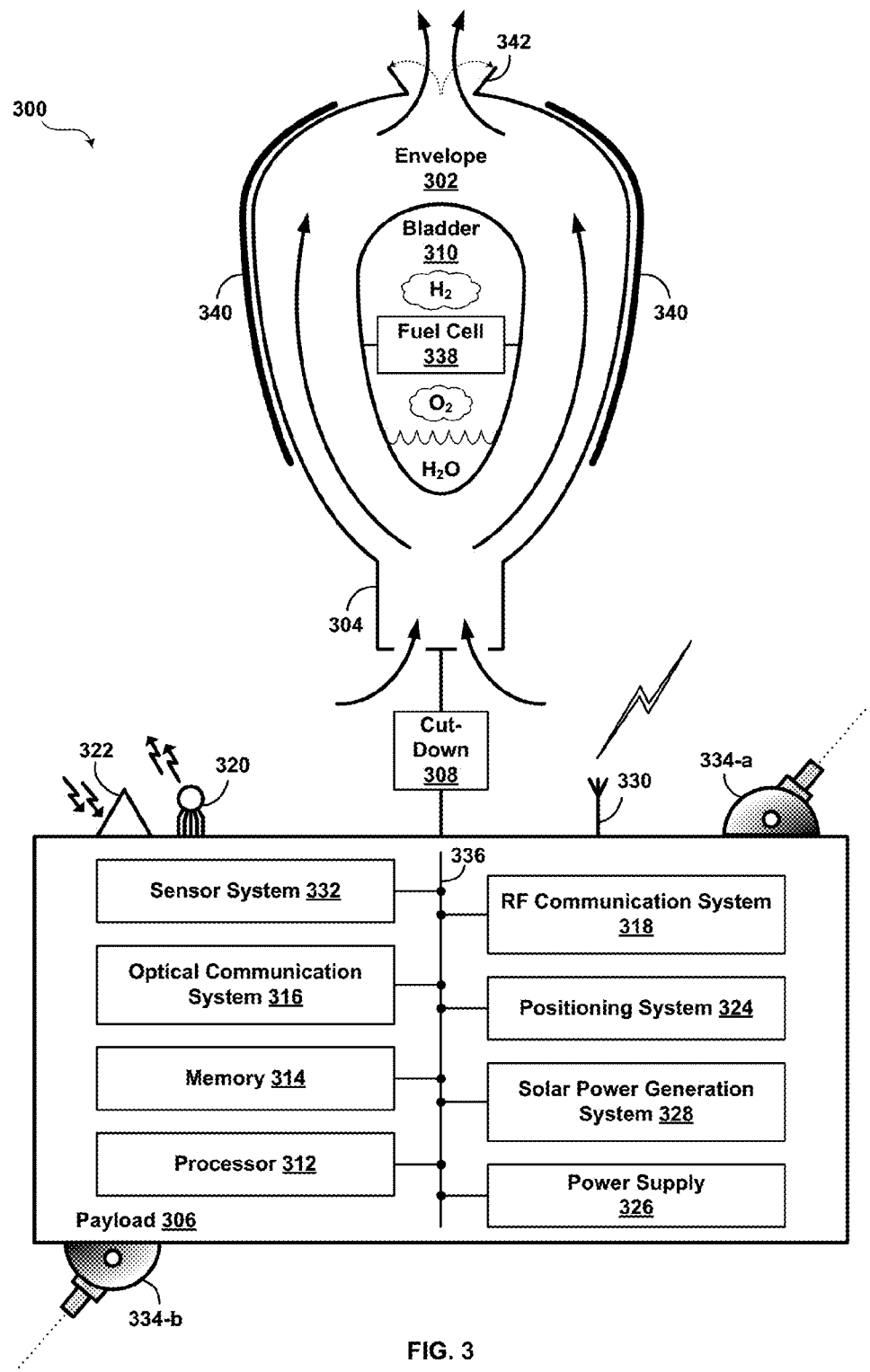
FIG. 3 is a simplified block diagram illustrating a high-altitude balloon, according to an example embodiment.

Various types of balloon systems may be incorporated in an example balloon network. As noted above, an example embodiment may utilize high-altitude balloons, which could typically operate in an altitude range between 17 km and 25 km. FIG. 3 shows a high-altitude balloon 300, according to an example embodiment. As shown, the balloon 300 includes an envelope 302, a skirt 304, a payload 306, and a cut-down system 308, which is attached between the skirt 304 and payload 306.

The envelope 302 and skirt 304 may take various forms, which may be currently well-known or yet to be developed. For instance, the envelope 302 and/or skirt 304 may be made of a highly-flexible latex material or may be made of a rubber material such as chloroprene. The envelope 302 and/or skirt 304 could also be made of an inflatable membrane with a fixed or nearly fix maximum volume. In one example embodiment, the envelope and/or skirt could be made of metalized Mylar or BoPet. Other materials are also possible. Further, the shape and size of the envelope 302 and skirt 304 may vary depending upon the particular implementation. Additionally, the envelope 302 may be filled with various different types of gases, such as helium and/or hydrogen and/or heated atmospheric air. Other types of gases are possible as well.

The payload 306 of balloon 300 may include a processor 312 and on-board data storage, such as memory 314. The memory 314 may take the form of or include a non-transitory computer-readable medium. The non-transitory computer-readable medium may have instructions stored thereon, which can be accessed and executed by the processor 312 in order to carry out the balloon functions described herein.

The payload 306 of balloon 300 may also include various other types of equipment and systems to provide a number of different functions. For example, payload 306 may include optical communication system 316, which may transmit optical signals via an ultra-bright LED system 320, and which may receive optical signals via an optical-communication receiver 322 (e.g., a photodiode receiver system). Further, payload 306 may include an RF communication system 318, which may transmit and/or receive RF communications via an antenna system 330.

The payload 306 may also include a power supply 326 to supply power to the various components of balloon 300. The power supply 326 could include a rechargeable battery. In other embodiments, the power supply 326 may additionally or alternatively represent other means known in the art for producing power.

In addition, the balloon 300 may include a solar power generation system 328. The solar power generation system 328 may include solar panels and could be used to generate power that charges and/or is distributed by power supply 326. The solar power generation system 328 could also include elements or components for enhancing the efficiency of passive absorption of radiant heat energy. Radiant heat could, in turn, be used for thermal functions or processes of the balloon, such as direct heating of the air in the envelope 302 and/or recharging one or more fuel cells (see below).

Further, payload 306 may include various types of other systems and sensors 332. For example, payload 306 may include one or more video and/or still cameras 334-a,b, a GPS system, various motion sensors (e.g., accelerometers, magnetometers, gyroscopes, and/or compasses), and/or various sensors for capturing environmental data. Further, some or all of the components within payload 306 may be implemented in a radiosonde or other probe, which may be operable to measure, e.g., pressure, altitude, geographical position (latitude and longitude), temperature, relative humidity, and/or wind speed and/or wind direction, among other information. Not all of the possible sensors and/or sensor components are necessarily shown in FIG. 3.

As noted, balloon 300 includes an ultra-bright LED system 320 for free-space optical communication with other balloons. As such, optical communication system 316 may be configured to transmit a free-space optical signal by modulating the ultra-bright LED system 320. The optical communication system 316 may be implemented with mechanical systems and/or with hardware, firmware, and/or software. Generally, the manner in which an optical communication system is implemented may vary, depending upon the particular application. An example of how the optical communication system 316 and other associated components may be used is described in further detail below.

The balloon may also include a positioning system 324 for determining geographic position and orientation, as well as controlling and/or adjusting geographic position and orientation. The positioning system 324 could operate in cooperation with other systems and/or subsystems of the balloon, such as the sensor system 332 and/or a navigation system. In addition the positioning system 324 could include functionality to control balloon altitude by controlling and/or adjusting a variable buoyancy system of the balloon, as described in more detail below. For instance, balloon 300 may include a variable buoyancy system, which is configured to change the altitude of the balloon 300 by adjusting the volume and/or density of the gas in the balloon 300. A variable buoyancy system may take various forms, and may generally be any system that can change the volume and/or density of gas in the envelope 302. As with other aspects of position determination and/or control, the positioning system 324 could operate cooperatively with other systems and subsystems of the balloon to actuate buoyancy control.

The various components, systems, and subsystems of the balloon 300 may share one or more communicative connections and/or power-distribution connections. These are represented in FIG. 3 by a bus 336. It will be appreciated that not all connections are necessarily shown in FIG. 3, and that there could be additional and/or different ones as well.

Further, a balloon 306 may include a navigation system (not shown). The navigation system could operate in conjunction and/or cooperation with the positioning system 324 in order to implement station-keeping functions for maintaining position within and/or moving to a position in accordance with a desired topology. In particular, the navigation system may use altitudinal wind data to determine altitudinal adjustments that result in the wind carrying the balloon in a desired direction and/or to a desired location. The positioning system 324 could include or function with an altitude-control system for making adjustments to temperature and/or density of the air in the envelope 302 in connection with one or another of the techniques of variable buoyancy control described below. The temperature and/or density adjustments could, in turn, effectuate the determined altitudinal adjustments and cause the balloon to move laterally in the desired direction and/or to the desired location. Alternatively, the altitudinal adjustments may be computed by a ground-based or satellite-based control system and communicated to the high-altitude balloon. In other embodiments, specific balloons in a heterogeneous balloon network may be configured to compute altitudinal adjustments for other balloons and transmit the adjustment commands to those other balloons.

As shown, the balloon 300 also includes a cut-down system 308. The cut-down system 308 may be activated to separate the payload 306 from the rest of balloon 300. The cut-down system 308 could include at least a connector, such as a balloon cord, connecting the payload 306 to the envelope 302 and a means for severing the connector (e.g., a shearing mechanism or an explosive bolt). In an example embodiment, the balloon cord, which may be nylon, is wrapped with a nichrome wire. A current could be passed through the nichrome wire to heat it and melt the cord, cutting the payload 306 away from the envelope 302.

The cut-down functionality may be utilized anytime the payload needs to be accessed on the ground, such as when it is time to remove balloon 300 from a balloon network, when maintenance is due on systems within payload 306, and/or when power supply 326 needs to be recharged or replaced.

In an alternative arrangement, a balloon may not include a cut-down system. In such an arrangement, the navigation system may be operable to navigate the balloon to a landing location, in the event the balloon needs to be removed from the network and/or accessed on the ground. Further, it is possible that a balloon may be self-sustaining, such that it does not need to be accessed on the ground. In other embodiments, in-flight balloons may be serviced by specific service balloons or another type of aerostat or aircraft.

It should be understood that a balloon and/or components thereof may vary from the illustrated balloon 300. For example, some or all of the components of balloon 300 may be omitted. Components of balloon 300 could also be combined. Further, a balloon may include additional components in addition or in the alternative to the illustrated components of balloon 300. Other variations are also possible.

2e) Example Variable Buoyancy System

In accordance with example embodiments, a variable buoyancy system may include one more openings in the bottom of the envelope 302 for drawing in cool, ambient air from the atmosphere, and one or more openings in the top of the envelope 302 for venting hot air in the envelope out to the atmosphere. By controlling a balance between cool air being drawn into the envelope and hot air being vented out of the envelope, the temperature, and therefore the buoyancy, of the air in the envelope may be regulated. For purposes of illustration, the envelope 302 is depicted in FIG. 3 as having adjustable vent covers 342 shown in an open position. The amount and rate of venting could be controlled by adjusting the vent covers 342, for example.

Operation of buoyancy regulation is illustrated diagrammatically in terms of air flow into and out of the envelope 302 in FIG. 3. Two short curved arrows at the bottom of the envelope 302 represent cool atmospheric air drawn in through openings at the bottom of the skirt 304. Two long arrows within the envelope 302 represent air rising toward the top the envelope 302 as the air is heated, either by solar heating (during the daytime) or by the fuel cell (during the night-time). Two short arrows leading out of the top of the envelope 302 represent venting hot air out of the balloon. As noted, the venting could be controlled by way of the adjustable vent covers 342, or other controllable mechanisms for adjusting the size of the vent openings.

In accordance with example embodiments, heating of the air in the envelope 302 may be achieved using solar energy during daylight hours, and utilizing a fuel cell 338 during night-time hours. More specifically, at altitudes typical of high-altitude balloon flight (e.g., the stratosphere), heating of the air in the envelope 302 by solar energy during daylight hours can generally be expected to dominate natural cooling from the cool atmospheric air outside of the envelope 302. In absence of any actions to cool the air in the envelope during daylight hours, the buoyancy of the balloon 300 will thus increase. However, by judicious venting hot air out of the top of the envelope 302 during daylight hours, the temperature of the air in the balloon may be regulated, and the buoyancy thereby controlled.

In further accordance with example embodiments, the balloon 300 may include a material that covers at least a portion of the outer surface of the envelope 302, and that has physical properties that make the material a more efficient absorber of solar energy than uncovered portions of the outer surface of the envelope 302. For example, the material could be paint or other applicable pigment that can cover a portion of the outer surface of the envelope 302. Alternatively, the material could be a flexible membrane affixed to and covering a portion of the outer surface of the envelope 302. The material as applied or attached to the outer surface of the envelope 302 is represented in FIG. 3 as a shroud 340. By orienting the balloon such that more or less of the shroud 340 is in direct sunlight, a larger or smaller amount of solar energy may be absorbed by the balloon 300. For example, the shroud 340 could be configured such that it may be brought into and out of sunlight by causing the balloon to rotate around a vertical axis. Thus, variable orientation of the shroud 340 with respect to the sun may provide a further aspect of heat and buoyancy regulation during the daytime.

During night-time hours when negligible direct solar energy is available, natural cooling can typically dissipate the residual heat of the air inside the envelope 302, leading to a drop in buoyancy. Accordingly, the fuel cell 338 may be used predominantly at night to compensate for potentially excessive cooling. By judiciously heating the air inside the envelope with the fuel cell, the temperature of the air in the balloon may again be regulated, and the buoyancy thereby again controlled.

In accordance example embodiments, the fuel cell 338 could be configured inside of a bladder 310 located within of the envelope 302, as illustrated in FIG. 3. In addition to housing the fuel cell 338, the bladder 310 could include one or more reservoirs or storage chambers to store the fuel for the fuel cell 338, as well as the exhaust product (by-product) of energy generation by the fuel cell 338. Because fuel cell operation generally produces heat as well as electrical energy, location the fuel cell 338 in a bladder 310 within the envelope 302, at least some of the heat produced can be readily available for heating the air inside the envelope 302. This, in turn, may reduce the amount of electrical power required for heating the air inside the envelope 302, thereby making at least some of the generated electrical power available for other functions of the balloon 330, such as operating electronics of the payload 306 and/or charging or more batteries, for example.

By way of example, the fuel cell 338 could be a hydrogen fuel cell. A hydrogen fuel cell can combine hydrogen and oxygen to produce water in a chemical process that also generates an electric current, as well as heat. The hydrogen (and oxygen) may be considered the fuel, and the water may be considered the exhaust or by-product. Storing the water makes it available for a reverse process in which energy is supplied to convert the water back into hydrogen and oxygen. For example, sunlight during the daytime can be used to drive a photo-catalytic water splitting process. Additionally or alternatively, excess solar heating—i.e., beyond what is sufficient to heat the air in the envelope for buoyancy purposes—may also be available for splitting the water into hydrogen and oxygen, as noted below. Other techniques for electrolysis are also possible as well. Running a hydrogen fuel cell in reverse to recover hydrogen and oxygen from water allows the hydrogen fuel cell to be used as a renewable energy source. The bladder 310 in FIG. 3 is represented as containing hydrogen gas and oxygen gas ($H_2$ and $O_2$), as well as water ($H_2O$). Thus, the fuel cell 338 may be considered a hydrogen fuel cell, at least for purposes of illustration.

Because direct solar heat absorbable or collectable by the balloon during daylight hours may typically be overabundant for purposes of heating the air in the balloon, at least a portion of the solar energy captured during the daytime can be made available to recharge the fuel cell. More particularly, by using solar energy to run the fuel cell 338 in reverse, the fuel cell 338 can serve as a renewable energy source for night-time heating (among other possible uses). In this way, example embodiments, such as the balloon 300, can enable very long duration, high-altitude flight: using unimpeded sunlight for solar heating during daytime, and a nearly perpetually renewable fuel cell for heating during the nighttime.

An order-of-magnitude estimate of available solar energy and balloon size may serve as a rough calibration of the amount of solar power that might be harnessed by a high-altitude balloon. The measure of solar radiation received per unit surface area per unit time at given position is referred to as "insolation" (and sometime also called "solar irradiation"). At altitudes characteristic of the stratosphere, insolation peaks during the daytime as high as about 1,360 Watts per square meter ($Wm^{-2}$), typically averaging around 1,000 $Wm^{-2}$ over the course of the day, as the sun's elevation with respect to the horizon changes. Because cloud cover is absent in the stratosphere and atmospheric absorption and/or attenuation over most of the solar spectrum are almost negligible, attenuation is significant only when the sun is at low elevations (e.g., sunrise and sunset), or during the winter at polar latitudes. Consequently, nearly all of the 1,000 $Wm^{-2}$ average insolation could irradiate a balloon flying in the stratosphere.

For purposes of illustration, a spherical balloon with radius of 10 meters (20 meter diameter) may be assumed, corresponding to a (circular) cross-sectional area of roughly 314 square meters available for collection of solar energy. Thus, such a high-altitude balloon could be expected to intercept in the neighborhood of 314 kilowatts (kW) of solar power. Not all of this may necessarily be absorbed—for example, some may be reflected. By constructing or covering the balloon envelope with an opaque black film or layer, however, it can be expected that approximately 70% or more of incident solar radiation can be converted to heat. For the reasonable estimate of 314 kW of solar power intercepted by a 10-meter radius balloon of the current illustrative example, this translates into tens or even hundreds of kilowatts of potential power generation. By way of further example, a high-absorptivity film or layer could be made of black polyethylene, among other possible materials.

Continuing with the illustration, 70% solar absorption of 314 kW is 220 kW (rounding to the nearest kW), which represents power due to radiant heat gain from the sun. The balloon will also loose heat to the atmosphere due primarily to radiation, with a small contribution from convection. At an altitude of 20 km, the typical air temperature of the stratosphere (outside of the balloon) is about −57° C. (or 216 K). In typical operation, the air temperature inside the balloon may be maintained about 100° C. hotter, or at about 43° C. (or 316 K). Taking, by way of example, the infrared (IR) emissivity of the balloon envelope to be 10%, radiant heat loss during the daytime will amount to approximately 3 kW. This estimate follows by assuming the balloon radiates like a blackbody in radiation environment of the earth's daytime radiative emission. Because convective heat losses will typically be dominated by radiative heat losses in the low atmospheric density of the stratosphere, a conservative upper limit to convective losses may be obtained by estimating convective losses equal to radiative losses. Thus for the present example, convective heat losses may be conservatively estimated to be 3 kW.

Taking account of both solar heating and radiative and convective heat losses then yields of approximately 214 kW of heat energy surplus from solar heating. In order to maintain an internal temperature of 43° C. (or 316 K), this surplus energy must disposed of in some way. The venting described above is one technique that can be used. In circumstances when venting may not be able to dispose of this surplus energy quickly enough—e.g., for purposes of regulating the buoyancy of the balloon—the extra surplus energy may be harvested and converted into a usable form, such as electricity. For example, the balloon could include a heat engine that can operate based on a difference in temperatures between the heated air inside the envelope and the cold air of the atmosphere outside the envelope. Such a heat engine could be used to generate electricity. The balloon could include, additionally or alternatively, other devices capable of converting heat energy to electrical and/or mechanical energy.

3. Balloon Network with Optical and Rf Links Between Balloons

In some embodiments, a high-altitude-balloon network may include super-node balloons, which communicate with one another via optical links, as well as sub-node balloons, which communicate with super-node balloons via RF links. Generally, the optical links between super-node balloons may be configured to have more bandwidth than the RF links between super-node and sub-node balloons. As such, the super-node balloons may function as the backbone of the balloon network, while the sub-nodes may provide sub-networks providing access to the balloon network and/or connecting the balloon network to other networks.

Figure 4:
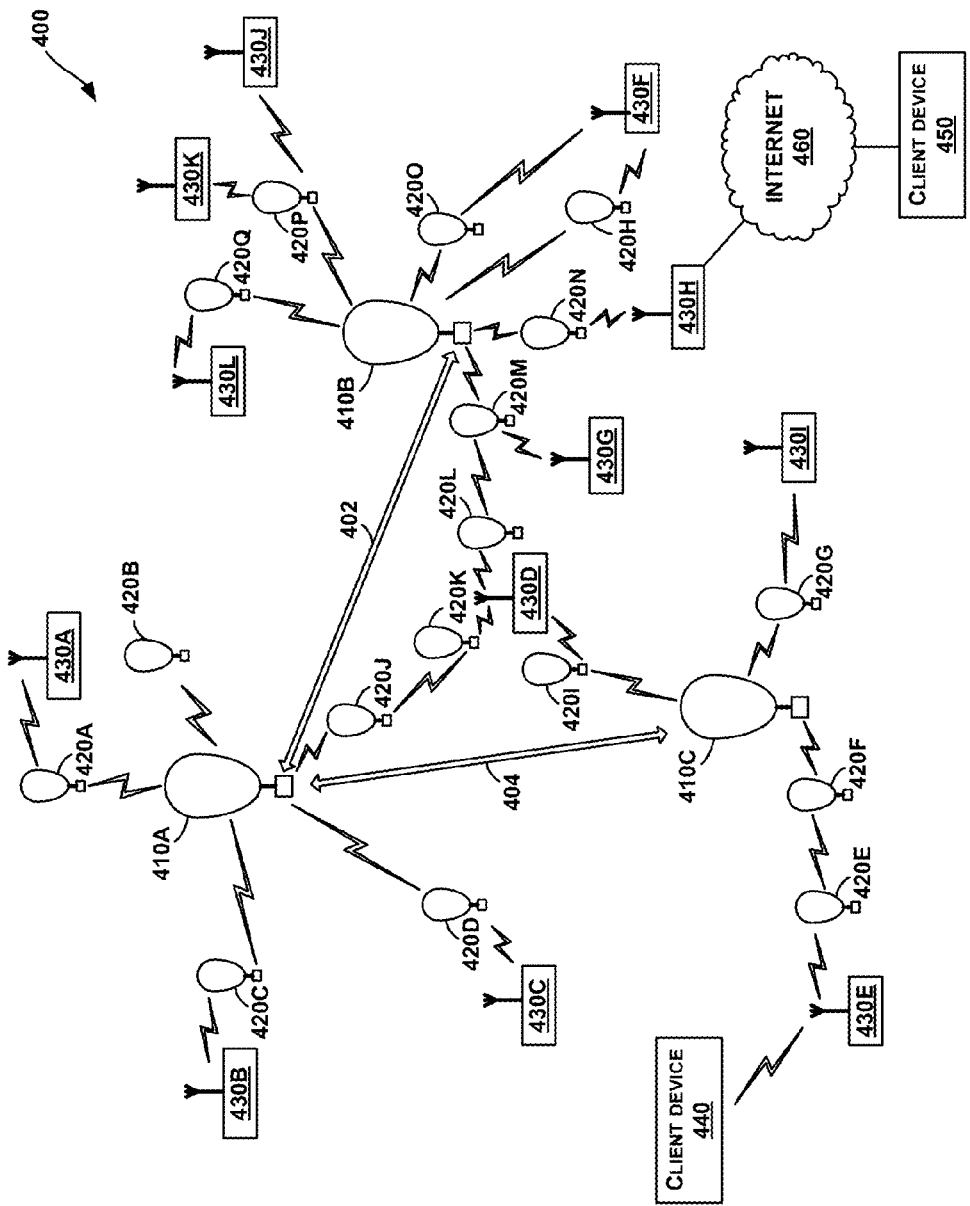
FIG. 4 is a simplified block diagram illustrating a balloon network that includes super-nodes and sub-nodes, according to an example embodiment.

FIG. 4 is a simplified block diagram illustrating a balloon network that includes super-nodes and sub-nodes, according to an example embodiment. More specifically, FIG. 4 illustrates a portion of a balloon network 400 that includes super-node balloons 410A to 410C (which may also be referred to as "super-nodes") and sub-node balloons 420 (which may also be referred to as "sub-nodes").

Each super-node balloon 410A to 410C may include a free-space optical communication system that is operable for packet-data communication with other super-node balloons. As such, super-nodes may communicate with one another over optical links. For example, in the illustrated embodiment, super-node 410A and super-node 401B may communicate with one another over optical link 402, and super-node 410A and super-node 401C may communicate with one another over optical link 404.

Each of the sub-node balloons 420 may include a radio-frequency (RF) communication system that is operable for packet-data communication over one or more RF air interfaces. Accordingly, each super-node balloon 410A to 410C may include an RF communication system that is operable to route packet data to one or more nearby sub-node balloons 420. When a sub-node 420 receives packet data from a super-node 410, the sub-node 420 may use its RF communication system to route the packet data to a ground-based station 430 via an RF air interface.

As noted above, the super-nodes 410A to 410C may be configured for both longer-range optical communication with other super-nodes and shorter-range RF communications with nearby sub-nodes 420. For example, super-nodes 410A to 410C may use using high-power or ultra-bright LEDs to transmit optical signals over optical links 402, 404, which may extend for as much as 100 miles, or possibly more. Configured as such, the super-nodes 410A to 410C may be capable of optical communications at speeds of 10 to 50 GB/sec or more.

A larger number of balloons may be configured as sub-nodes, which may communicate with ground-based Internet nodes at speeds on the order of approximately 10 MB/sec. Configured as such, the sub-nodes 420 may be configured to connect the super-nodes 410 to other networks and/or to client devices.

Note that the data speeds and link distances described in the above example and elsewhere herein are provided for illustrative purposes and should not be considered limiting; other data speeds and link distances are possible.

In some embodiments, the super-nodes 410A to 410C may function as a core network, while the sub-nodes 420 function as one or more access networks to the core network. In such an embodiment, some or all of the sub-nodes 420 may also function as gateways to the balloon network 400. Additionally or alternatively, some or all of ground-based stations 430 may function as gateways to the balloon network 400.

4. Illustrative Methods

Figure 5:
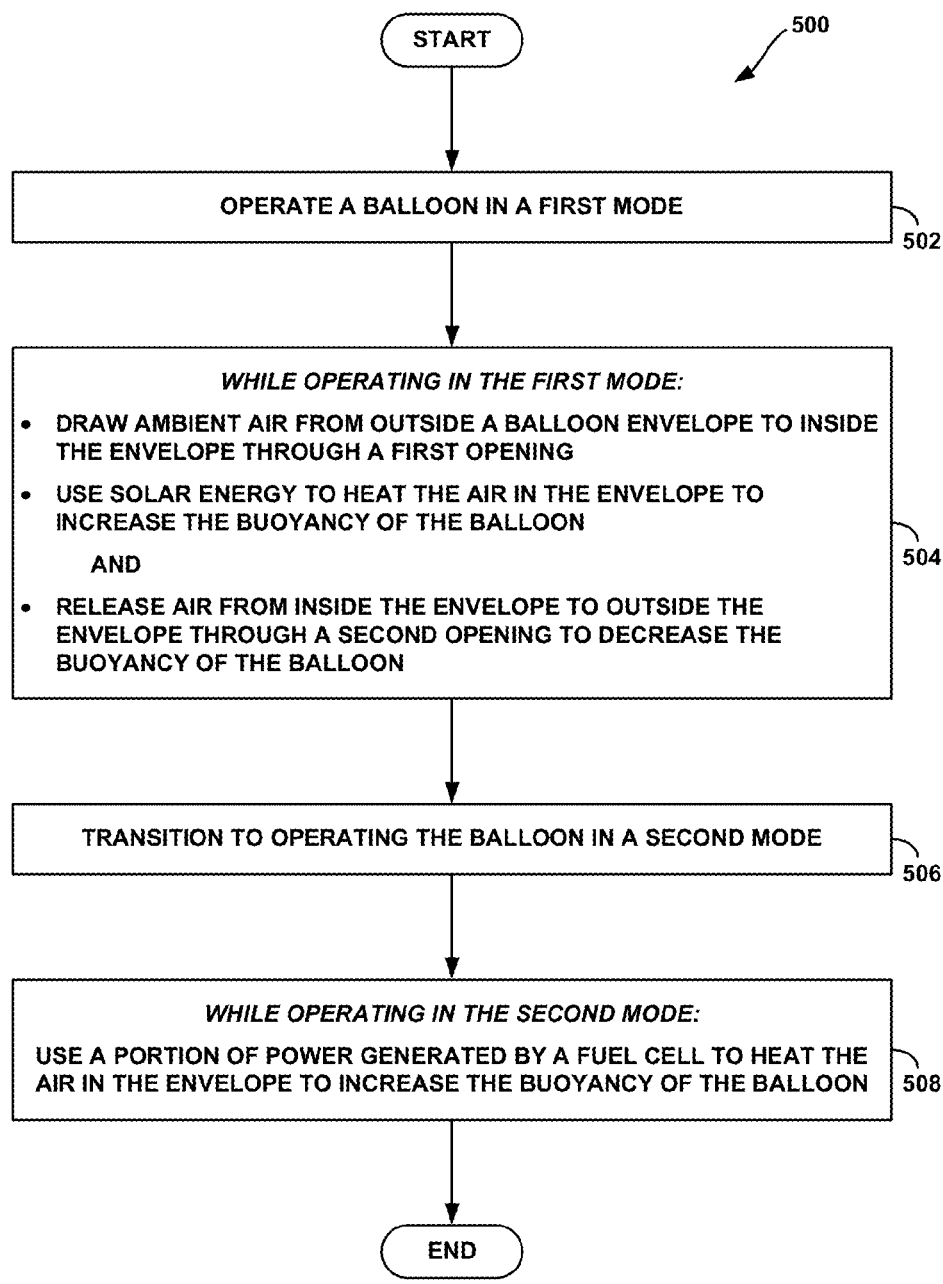
FIG. 5 is a flow chart illustrating a computer-implemented method, according to an example embodiment.
Figure 6:
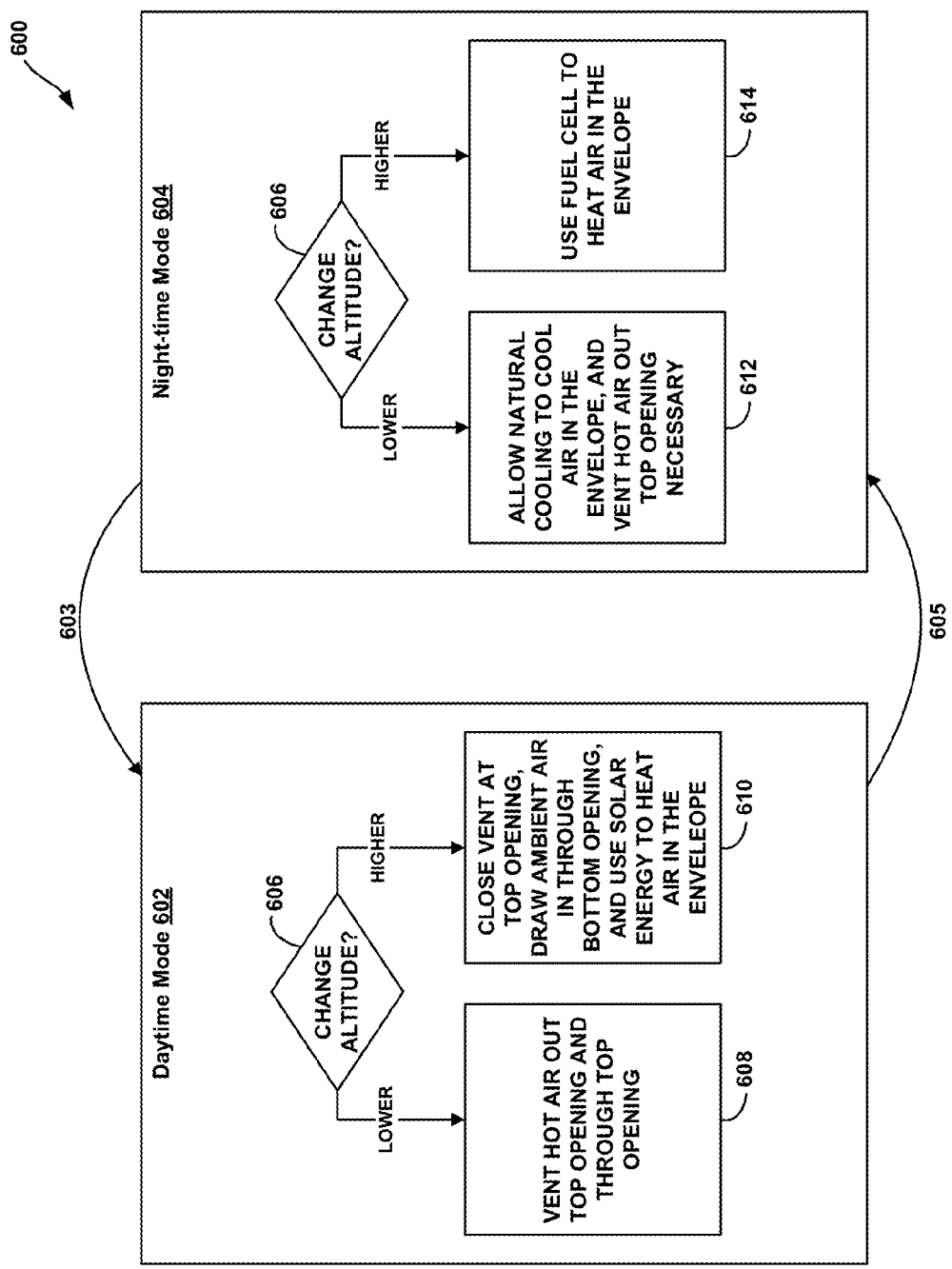
FIG. 6 is a combined operational state diagram illustrating the functions of a balloon that utilizes solar heating and a fuel cell for altitude control, according to an example embodiment.

FIGS. 5 and 6 are flow charts illustrating computer-implemented methods 500 and 600, according to an example embodiment. Example methods, such as methods 500 and 600, may be carried out by a control system and/or by other components of balloon (e.g., part of a balloon payload). For example, the control system could include or be part of the positioning system 324 described above in connection with FIG. 3. Further, a control system may take the form of program instructions stored on a non-transitory computer readable medium (e.g., memory 314 of FIG. 3, magnetic disk, CDROM, digital video disk (DVD), etc.) and a processor that executes the instructions (e.g., processor 312). However, a control system may take other forms including software, hardware, and/or firmware. In addition, control functions, such as those illustrated by way of example below, could be carried out, at least in part, by a ground-based, satellite-based, or other remote control system, and communicated to the high-altitude balloon.

Example methods may be implemented as part of a balloon's altitude control process. Yet further, example methods may be implemented as part of or in conjunction with a balloon's power generation and/or power management processes.

As shown in block 502, the example method involves causing a balloon to operate in a first mode. In keeping the example balloon described above, the balloon include an envelope with a first opening and a second opening, as well as a fuel cell. Operation of the balloon in the first mode may include various actions and functions, at least some of which may characterize, or be specific to, the first mode. The description below details certain aspects of operation in the first mode that relate to altitude control via temperature/buoyancy regulation. It should be understood that there could be other aspects of operation in the first mode that are not necessarily directly connected or associated with altitude control.

As shown in block 504, while the balloon is operating in the first mode, ambient air from outside the envelope may be drawn inside the envelope through the first opening. More particularly, the ambient air may be atmospheric air of the locale where the balloon is operating (flying/floating). Also while operating in the first mode, solar energy is used to heat the air in the balloon, such that the buoyancy of the balloon is increased. That is, as the air in the balloon becomes hotter due to solar heating, its density decreases and its buoyancy increases. While still operating in the first mode, air may be released from inside the envelope to outside the envelope through the second opening, such that the buoyancy of the balloon is decreased. That is, the release of the hot air inside the envelope can cause the temperature of the air inside to decrease, for example as the cooler ambient air drawn in from the first opening displaces the hotter air that is released through the second opening. As a result, the density of the air increases and its buoyancy decreases.

At block 506, the balloon transitions to operating in a second mode. As with operation in the first mode, operation of the balloon in the second mode may include various actions and functions, at least some of which may characterize, or be specific to, the second mode. The description below details certain aspects of operation in the second mode that relate to altitude control via temperature/buoyancy regulation. Again, it should be understood that there could be other aspects of operation in the second mode that are not necessarily directly connected or associated with altitude control.

As shown in block 508, while the balloon is operating in the second mode, a portion of the power generated by the fuel cell may be used to heat the air in the envelope, such that the buoyancy of the balloon is increased. That is, as the air in the balloon becomes hotter due to heating by the fuel cell, its density decreases and its buoyancy increases.

Although not shown explicitly, the method 500 may also include the balloon transitioning back from operating in the second mode to operating in the first mode.

In accordance with example embodiments, the first mode could be a daytime mode and the second mode could be a night-time mode. Further, using solar energy to heat the air in the envelope could correspond to passively heating the air in the envelope with solar radiation absorbed through an outer surface of the envelope. More specifically, passively heating the air in the envelope with solar radiation absorbed through the outer surface of the envelope could be accomplished by orienting at least a portion of a radiant-heatabsorbing surface on the outside surface of the envelope to be in direct sunlight. By way of example, the radiant-heat-absorbing surface could be the shroud 340 described above in connection with FIG. 3.

In further accordance with example embodiments, and the first mode being the daytime mode and the second mode being the night-time mode, transitioning to operating the balloon in a second mode could correspond to the causing the balloon to transition from operating in the daytime mode to operating in the night-time mode in response to detecting a predetermined day-night transition condition. For example, an optical detector or camera on the balloon could be used to detect sunrise and/or sunset, which could then trigger an appropriate mode transition (e.g., sunrise could trigger transition to daytime mode, and sunset could trigger transition to night-time mode). As another example, detecting the temperature of the outer surface of the envelope above or below a threshold could be used to trigger a mode transition. As yet another example, an astronomical ephemeris of sun position in the sky could be used to determine time ranges appropriate for operation in each mode at the altitude and geographic location of the balloon at any given time. The time boundaries between ranges could be used to trigger mode transitions.

In accordance with example embodiments, the balloon could also include a solar power system that generates energy from absorbed sunlight. An example is the solar power generation system 328 discussed above in connection with FIG. 3. Then, with the first mode again being the daytime mode and the second mode again being the night-time mode, operating the balloon in the first mode could also entail using a portion of the energy generated by the solar power system during operation of the balloon in the daytime mode for recharging the fuel cell.

More particularly, the fuel cell could generate power by converting two or more chemical compounds into a derived chemical compound by a process that generates electricity and releases heat. Recharging the fuel cell could then entail using at least some of the energy generated by the solar power system to convert the derived chemical compound into recovered forms of the two or more chemical compounds, and then storing the recovered forms of the two or more chemical compounds. By way of example, and in keeping with the discussion above, the fuel cell could be a hydrogen fuel cell that operates by converting $H_2$ and $O_2$ to water ($H_2O$) to generate electricity and produce heat. Energy from the solar power system could be used to split the water back into $H_2$ and $O_2$, thereby recharging the fuel cell.

In accordance with example embodiments, and as described in connection with FIG. 3, the first opening is located at a bottom end of the envelope and the second opening is located at a top end of the envelope. With this configuration, drawing ambient air from outside the envelope to inside the envelope through the first opening corresponds to generating a circulation of air through the envelope, inward from the first opening and outward through the second opening. That is, as the air inside the envelope heats and rises, the drop in density with respect to the ambient atmosphere can cause air to be drawn in through the opening at the bottom of the envelope. The hot air in the envelope venting out the top opening of the envelope is thus replaced by heating the cool air drawn in through the bottom open, resulting in the circulation of air through the envelope. The curved arrows shown in FIG. 3 exemplify the air flow.

Also in accordance with example embodiments, releasing air from inside the envelope to outside the envelope through the second (top) opening such that the buoyancy of the balloon decreases could correspond to balancing the increased buoyancy from solar heat with the decreased buoyancy to achieve a net buoyancy that causes the balloon to float at a given altitude. More particularly, the control system of the balloon could include an altitude control function or component that can determine a buoyancy needed to achieve and/or maintain a given altitude of the balloon, and what temperature (or range of temperatures) the air in the envelope must be at (or within) to achieve and/or maintain the requisite buoyancy. The requisite temperature (or temperature range) could then be achieve and/or maintained by appropriately venting hot air out the top of the envelope.

Additionally or alternatively, venting hot air out the top opening of the envelope could be controlled through feedback (e.g., servo) system that monitors altitude in real time, and adjusts the venting rate so as to achieve and/or maintain a requisite or target altitude. In this implementation, target temperature and/or buoyancy may not necessarily be determined or calculated, but rather achieved and/or maintained through operational feedback. Other techniques for achieving and/or maintaining a net or target buoyancy may be used as well.

In a similar manner, and also accordance with example embodiments, using a portion of the power generated by the fuel cell to heat the air in the envelope such that the buoyancy of the balloon increases could correspond to balancing a decrease in buoyancy due to natural cooling of the air inside the envelope with the increased buoyancy from a portion of the power generated by the fuel cell to achieve a net buoyancy that causes the balloon to float at a given altitude. More particularly, an amount of heating by the fuel cell needed to achieve and/or maintain a temperature of the air in the envelope that yields a requisite or target buoyancy could again be determined by an altitude control system. As with venting, the determination could be based on a known or derivable functional dependence of buoyancy on temperature, or by way of an operation feedback process.

FIG. 6 illustrates an alternative form of display of the method 500 of FIG. 5, combining a simplified flowchart with an operation state diagram to depict a method 600. More specifically, a balloon may operate in a daytime mode 602 and a night-time mode 604. As shown, the balloon may make a transition 603 from the night-time mode 604 to the daytime mode 602, and a transition 605 from the daytime mode 602 to the night-time mode 604.

Further, the balloon may transition between the daytime mode 602 and the night-time mode 604 when it detects certain conditions (e.g., a certain time of day, the availability of a certain amount of sunlight (or lack thereof), etc.). Alternatively, a balloon may be instructed when to transition between the daytime mode 602 and the night-time mode 604 by another entity, such as another balloon in the balloon network or a ground-based station, for instance.

A balloon may implement various processes that involve altitudinal adjustment, such as various types of station-keeping processes, where altitudinal movements take advantage of altitudinally varying winds to achieve longitudinal and latitudinal movement, for instance. According to an example embodiment, the daytime mode 602 and the night-time mode 604 the may involve different techniques for increasing the balloon's altitude, and different techniques for decreasing the balloon's altitude.

In particular, while operating in the daytime mode 602, the balloon may determine that the balloon should change its altitude, as shown by block 606 (shown within daytime mode 602). If the balloon determines it should move to a lower altitude, the balloon may decrease its buoyancy by venting hot air out of the top of envelope into the atmosphere, as shown by block 608. As described above, venting can cause the internal air temperature to drop, resulting in a decrease in buoyancy. The balloon's altitude may then drop in response.

Further, if the balloon determines it should move to a higher altitude while the balloon is operating in the daytime mode 602, then the balloon may increase its buoyancy by closing or restricting the venting of hot air out of the top opening, as shown by block 610. Also as described above, closing or restricting the vent can allow solar heating to dominate cooling, and thereby lead to increased internal air temperature and correspondingly increased buoyancy. The balloon's altitude may then increase in response. Further, in daytime mode 602, the balloon may utilize power from its solar power system to operate its fuel cell in reverse.

Further, while operating in the night-time mode 604, the balloon may also determine that the balloon should change its altitude, as shown by block 606 (shown again within night-time mode 604). However, altitude adjustments may be accomplished differently in night-time mode 604. In example embodiment, if the balloon determines it should move to a lower altitude, the balloon may decrease its buoyancy by allowing natural cooling of the air in envelope to dominate heating, thereby causing the internal air temperature to drop, and resulting in a decrease in buoyancy, as shown by block 612. The balloon's altitude may then drop in response. Increasing the natural cooling over heating may be achieved by reducing or ceasing heating by the fuel cell, for example. If additional and/or more rapid cooling is needed, venting could also be used (though this is not explicitly included in block 612).

If the balloon determines it should move to a higher altitude while the balloon is operating in the night-time mode 604, then the balloon may increase using the fuel cell to heat the air inside the envelope, as shown by block 614. To do so, the balloon could use electricity generated by the fuel cell to power an electric heater, for example. Additionally or alternatively, heat release by the running the fuel cell to generate electricity could be used directly to heat the air inside the envelope. Further still, a portion of the electricity generated by the fuel cell and/or a portion of the heat produced by the fuel cell could be used as a power source for other functions of the balloon.

Note that a balloon may determine that it should change altitude at various points in time, while operating in the daytime mode and/or while operating in the night-time mode. Accordingly, block 608 and/or block 610 may each be carried out a number of times while the balloon is operating in daytime mode 602. Similarly, block 612 and/or block 614 may each be carried out a number of times while the balloon is operating in daytime mode 602. However, it is also possible that block 608 and/or block 610 might not be carried out at all during a single period in which the balloon operates in daytime mode 602 (e.g., during a single day).

5. Conclusion

The above detailed description describes various features and functions of the disclosed systems, devices, and methods with reference to the accompanying figures. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A computer-implemented method for operating a balloon, the method comprising:
   operating the balloon in a first mode, wherein the balloon comprises an envelope having a first opening and a second opening and containing lifting gas formed from heated ambient air, and a fuel cell contained inside a bladder within the envelope;
   in order to control buoyancy while operating the balloon in the first mode:
   drawing ambient air from outside the envelope to inside the envelope through the first opening, the ambient air outside the envelope being colder than air inside the envelope;
   using solar energy to heat the air within the envelope such that a buoyancy of the balloon is increased, the air heated within the envelope forming the lifting gas for the balloon; and
   releasing air heated within the envelope from inside the envelope to outside the envelope through the second opening such that the buoyancy of the balloon is decreased;
   transitioning to operating the balloon in a second mode; and
   in order to control buoyancy while operating the balloon in the second mode:
   using a portion of power generated by the fuel cell to heat the air within the envelope such that the buoyancy of the balloon is increased,
   wherein the fuel cell generates power by converting two or more chemical compounds into a derived chemical compound by a process that generates electricity and releases heat, the two or more chemical compounds being stored within the bladder.

2. The method of claim 1, further comprising transitioning from operating the balloon in the second mode to operating the balloon in the first mode.

3. The method of claim 1, wherein the first mode is a daytime mode and the second mode is a night-time mode, and wherein using solar energy to heat the air within the envelope comprises passively heating the air in the envelope with solar radiation absorbed through an outer surface of the envelope.

4. The method of claim 3, wherein passively heating the air in the envelope with solar radiation absorbed through the outer surface of the envelope comprises orienting at least a portion of a radiant-heat-absorbing surface on the outside surface of the envelope to be in direct sunlight.

5. The method of claim 3, wherein transitioning to operating the balloon in a second mode comprises:
   detecting a predetermined day-night transition condition; and
   responsively causing the balloon to transition from operating in the daytime mode to operating in the night-time mode.

6. The method of claim 1, wherein the balloon further comprises a solar power system that generates energy from absorbed sunlight,
   wherein the first mode is a daytime mode and the second mode is a night-time mode,
   and wherein operating the balloon in the first mode comprises using a portion of the energy generated by the solar power system during operation of the balloon in the daytime mode for recharging the fuel cell.

7. The method of claim 6,
wherein recharging the fuel cell comprises:
using at least some of the energy generated by the solar power system to convert the derived chemical compound into recovered forms of the two or more chemical compounds; and
storing within the bladder the recovered forms of the two or more chemical compounds.

8. The method of claim 1, wherein the first opening is located at a bottom end of the envelope and the second opening is located at a top end of the envelope,
and wherein drawing ambient air from outside the envelope to inside the envelope through the first opening comprises generating a circulation of air through the envelope, inward from the first opening and outward through the second opening.

9. The method of claim 1, wherein releasing air heated within the envelope from inside the envelope to outside the envelope through the second opening such that the buoyancy of the balloon decreases comprises balancing the increased buoyancy from solar heat with the decreased buoyancy to achieve a net buoyancy that causes the balloon to float at a given altitude.

10. The method of claim 1, wherein using a portion of the power generated by the fuel cell to heat the air within the envelope such that the buoyancy of the balloon increases comprises balancing a decrease in buoyancy due to natural cooling of the air inside the envelope with the increased buoyancy from a portion of the power generated by the fuel cell to achieve a net buoyancy that causes the balloon to float at a given altitude.

11. A non-transitory computer readable medium having stored therein instructions that, upon execution by one or more processors of a balloon system, cause the balloon system to carry out functions for operating a balloon of the balloon system, the functions including:
operating the balloon in a first mode, wherein the balloon comprises an envelope having a first opening and a second opening and containing lifting gas formed from heated ambient air, and a fuel cell contained inside a bladder within the envelope;
in order to control buoyancy while operating the balloon in the first mode:
drawing ambient air from outside the envelope to inside the envelope through the first opening, the ambient air outside the envelope being colder than air inside the envelope;
using solar energy to heat the air within the envelope such that a buoyancy of the balloon is increased, the air heated within the envelope forming the lifting gas for the balloon; and
releasing air heated within the envelope from inside the envelope to outside the envelope through the second opening such that the buoyancy of the balloon is decreased;
transitioning to operating the balloon in a second mode; and
in order to control buoyancy while operating the balloon in the second mode:
using a portion of power generated by the fuel cell to heat the air within the envelope such that the buoyancy of the balloon is increased,
wherein the fuel cell generates power by converting two or more chemical compounds into a derived chemical compound by a process that generates electricity and releases heat, the two or more chemical compounds being stored within the bladder.

12. The non-transitory computer readable medium of claim 11, wherein the functions further include transitioning from operating the balloon in the second mode to operating the balloon in the first mode.

13. The non-transitory computer readable medium of claim 11, wherein the first mode is a daytime mode and the second mode is a night-time mode,
and wherein using solar energy to heat the air within the envelope comprises passively heating the air in the envelope with solar radiation absorbed through an outer surface of the envelope.

14. The non-transitory computer readable medium of claim 13, wherein passively heating the air in the envelope with solar radiation absorbed through the outer surface of the envelope comprises orienting at least a portion of a radiant-heat-absorbing surface on the outside surface of the envelope to be in direct sunlight.

15. The non-transitory computer readable medium of claim 13, wherein transitioning to operating the balloon in a second mode comprises:
detecting a predetermined day-night transition condition; and
responsively causing the balloon to transition from operating in the daytime mode to operating in the night-time mode.

16. The non-transitory computer readable medium of claim 11, wherein the balloon further comprises a solar power system that generates energy from absorbed sunlight,
wherein the first mode is a daytime mode and the second mode is a night-time mode,
and wherein operating the balloon in the first mode comprises using a portion of the energy generated by the solar power system during operation of the balloon in the daytime mode for recharging the fuel cell.

17. The non-transitory computer readable medium of claim 16,
wherein recharging the fuel cell comprises:
using at least some of the energy generated by the solar power system to convert the derived chemical compound into recovered forms of the two or more chemical compounds; and
storing within the bladder the recovered forms of the two or more chemical compounds.

18. The non-transitory computer readable medium of claim 11, wherein the first opening is located at a bottom end of the envelope and the second opening is located at a top end of the envelope,
and wherein drawing ambient air from outside the envelope to inside the envelope through the first opening comprises generating a circulation of air through the envelope, inward from the first opening and outward through the second opening.

19. The non-transitory computer readable medium of claim 11, wherein releasing air heated within the envelope from inside the envelope to outside the envelope through the second opening such that the buoyancy of the balloon decreases comprises balancing the increased buoyancy from solar heat with the decreased buoyancy to achieve a net buoyancy that causes the balloon to float at a given altitude.

20. The non-transitory computer readable medium of claim 11, wherein using a portion of the power generated by the fuel cell to heat the air within the envelope such that the buoyancy of the balloon increases comprises balancing a decrease in buoyancy due to natural cooling of the air inside the envelope with the increased buoyancy from a portion of the power generated by the fuel cell to achieve a net buoyancy that causes the balloon to float at a given altitude.

21. A balloon system comprising:
- a balloon having an envelope with a first opening and a second opening and containing lifting gas formed from heated ambient air, the first opening being configured to draw ambient air from outside the envelope to inside the envelope, the ambient air outside the envelope being colder than air inside the envelope, and the second opening being configured to release air from inside the envelope to outside the envelope,
- wherein the envelope is configured to use solar energy to heat the air within the envelope such that a buoyancy of the balloon is increased, the air heated within the envelope forming the lifting gas for the balloon,
- and wherein the envelope is further configured to release air heated within the envelope from inside the envelope to outside the envelope through the second opening envelope such that the buoyancy of the balloon is decreased; and
- a fuel cell contained inside a bladder within the envelop and configured to heat the air within the envelope such that the buoyancy of the balloon is increased when solar energy is not available in sufficient quantity to heat the air within the envelope,
- wherein the fuel cell generates power by converting two or more chemical compounds into a derived chemical compound by a process that generates electricity and releases heat, the two or more chemical compounds being stored within the bladder.

22. The balloon system of claim 21, wherein the use of solar energy to heat the air within the envelope comprises passive heating of the air in the envelope with solar radiation absorbed through an outer surface of the envelope.

23. The balloon system of claim 22, wherein passive heating of the air in the envelope with solar radiation absorbed through the outer surface of the envelope comprises orienting at least a portion of a radiant-heat-absorbing surface on the outside surface of the envelope to be in direct sunlight.

24. The balloon system of claim 21, wherein the use of solar energy to heat the air within the envelope and the release of air from inside the envelope to outside the envelope through the second opening comprise operations of a first operating mode of the balloon system,
- wherein use of the fuel cell to heat the air within the envelope comprises an operation of a second operating mode of the balloon system,
- and wherein the balloon system is configured to transition between the first and second operating modes.

25. The balloon system of claim 24, wherein the first operating mode is a daytime mode and the second operating mode is a night-time mode.

26. The balloon system of claim 25, the balloon system is further configured to transition from operating in the daytime mode to operating in the night-time mode in response to occurrence of a predetermined day-night transition condition.

27. The balloon system of claim 24, wherein the balloon further comprises a solar power system configured to generate energy from absorbed sunlight,
- wherein the first operating mode is a daytime mode and the second operating mode is a night-time mode,
- and wherein the balloon system is further configured to use a portion of the energy generated by the solar power system for recharging the fuel cell while the balloon system is operating in the daytime mode.

28. The balloon system of claim 27,
- wherein the fuel cell is configured to be recharged by using at least some of the energy generated by the solar power system to convert the derived chemical compound into recovered forms of the two or more chemical compounds, and then storing within the bladder the recovered forms of the two or more chemical compounds.

29. The balloon system of claim 21, wherein the first opening is located at a bottom end of the envelope and the second opening is located at a top end of the envelope,
- and wherein the envelope is further configured to contain a circulation of air through the envelope, inward from the first opening and outward through the second opening.

30. The balloon system of claim 21, wherein the release of air from inside the envelope to outside the envelope through the second opening envelope such that the buoyancy of the balloon is decreased comprises balancing the increased buoyancy from solar heat with the decreased buoyancy to achieve a net buoyancy that causes the balloon to float at a given altitude.

31. The balloon system of claim 21, wherein use of the fuel cell to heat the air within the envelope such that the buoyancy of the balloon is increased when solar energy is not available in sufficient quantity to heat the air within the envelope comprises balancing a decrease in buoyancy due to natural cooling of the air inside the envelope with the increased buoyancy from a portion of power generated by the fuel cell to achieve a net buoyancy that causes the balloon to float at a given altitude.

* * * * *